(12) United States Patent
Zeller

(10) Patent No.: US 11,379,634 B2
(45) Date of Patent: Jul. 5, 2022

(54) SYSTEM AND METHOD FOR SAFETY ANALYSIS OF FAILURE BEHAVIOR

(71) Applicant: SIEMENS AKTIENGESELLSCHAFT, Munich (DE)

(72) Inventor: Marc Zeller, Munich (DE)

(73) Assignee: SIEMENS INDUSTRY SOFTWARE NV, Leuven (BE)

( * ) Notice: Subject to any disclaimer, the term of this patent is extended or adjusted under 35 U.S.C. 154(b) by 238 days.

(21) Appl. No.: 16/599,183

(22) Filed: Oct. 11, 2019

(65) Prior Publication Data

US 2020/0125687 A1 Apr. 23, 2020

(30) Foreign Application Priority Data

Oct. 18, 2018 (EP) .................................... 18201232

(51) Int. Cl.
*G06F 30/20* (2020.01)
*G06F 8/10* (2018.01)
*G06F 111/20* (2020.01)

(52) U.S. Cl.
CPC ................ *G06F 30/20* (2020.01); *G06F 8/10* (2013.01); *G06F 2111/20* (2020.01)

(58) Field of Classification Search
CPC ......... G06F 30/20; G06F 8/10; G06F 2111/20
See application file for complete search history.

(56) References Cited

U.S. PATENT DOCUMENTS

2016/0171506 A1\* 6/2016 Hofig .................. G06Q 30/018
705/317
2017/0132054 A1\* 5/2017 Hofig .................... G06F 11/004
2017/0185470 A1\* 6/2017 Hofig .................... G06F 11/008

OTHER PUBLICATIONS

Kaiser, B., Weber, R., Oertel, M., Böde, E., Nejad, B.M. and Zander, J., 2015. Contract-based design of embedded systems integrating nominal behavior and safety. Complex Systems Informatics and Modeling Quarterly, (4), pp. 66-91. (Year: 2015).\*
I. Bate, R. Hawkins und J. McDermid, "A Contract-based Approach to Designing Safe Systems", 8th Australian Workshop on Safety Critical Systems and Software, 2003; 2003.
Vesely W E et al: "Fault Tree Handbook" US Nuclear Regulatory Commission (1981), NUREG-0492, Jan. 1981.
T. Gezgin, R. Weber und M. Girod, "A refinement checking technique for contract-based architecture design", Fourth International Workshop on Model Based Architecting and Construction of Embedded Systems, ACES-MB, 2011.

(Continued)

*Primary Examiner* — Chuen-Meei Gan
(74) *Attorney, Agent, or Firm* — Schmeiser, Olsen & Watts LLP

(57) ABSTRACT

Provided is a system for safety analysis of failure behavior for a unit including two or more components with at least one inport for receiving failure data and one outport for transmitting failure data, wherein for the analysis of the failures data of the components and/or the unit a safety contract is used, and wherein the safety contract is generated automatically by a model-based safety analysis model comprising separate SAM modules which are related to the components of the unit.

8 Claims, 2 Drawing Sheets

(56) References Cited

OTHER PUBLICATIONS

Irfan Sljivo et al: "Generation of Safety Case Argument—Fragments from Safety Contracts1"; Proc.Int.Conf. Adv. Biometrics (ICB); [Lecture Notes in Computer Science; Lect.Notes Computer], Springer, Berlin, Heidelberg, pp. 170-185, XP047298289, ISBN: 978-3-642-17318-9 Sections 3 and 4.
Irfan Sljivo et al: "Deriving Safety Contracts to Support Architecture Design of Safety Critical Systems", 2015 IEEE 16th International Symposium on High Assurance Systems Engineering, IEEE, pp. 126-133, XP032731538, DOI: 10.1109/HASE.2015.27, [retrieved on Jan. 29, 2015]; the whole document.
Bernhard Kaiser et al: "Contract-Based Design of Embedded Systems Integrating Nominal Behavior and Safety", Complex Systems Informatics and Modeling Quarterly, No. 4, pp. 66-91, XP055573660, DOI: 10.7250/csimq.2015-4.05; Sections 2-4 / Oct. 30, 2015; 2015.
Bertrand Meyer, "Applying 'design by contract'", IEEE Computer, Bd. 25, Nr. 10, 1992; 1992.
European Extended Search Report dated Apr. 4, 2019 for Application No. 18201232.8.

\* cited by examiner

SYSTEM AND METHOD FOR SAFETY ANALYSIS OF FAILURE BEHAVIOR

CROSS-REFERENCE TO RELATED APPLICATIONS

This application claims priority to European Application No. 18201232.8, having a filing date of Oct. 18, 2018, the entire contents of which are hereby incorporated by reference.

FIELD OF TECHNOLOGY

The following generally relates to a system and method for safety analysis of failure behavior for a unit comprising two or more components.

BACKGROUND

There is an increasing trend of industrial automation systems, assets, machines, sensors, mobile devices etc. in all fields of industrial production, energy, transportation and in other areas as banking, retail, hospitality and medical health care systems being connected via network connections to the Industrial Internet of Things (IIoT) directly or via cloud gateways. Data analytics (data mining, deep learning, artificial intelligence) is a core aspect in this whole area of connected things and generates a new level of knowledge and usability.

In systems based on cloud computing technology, a large number of devices is connected to a cloud computing system via the Internet. The devices may be located in a remote facility connected to the cloud computing system. For example, the devices can comprise, or consist of, equipment, sensors, actuators, robots, and/or machinery in an industrial set-up(s). The devices can be medical devices and equipment in a healthcare unit. The devices can be home appliances or office appliances in a residential/commercial establishment.

The cloud computing system may enable remote configuring, monitoring, controlling, and maintaining connected devices (also commonly known as 'assets'). Also, the cloud computing system may facilitate storing large amounts of data periodically gathered from the devices, analyzing the large amounts of data, and providing insights (e.g., Key Performance Indicators, Outliers) and alerts to operators, field engineers or owners of the devices via a graphical user interface (e.g., of web applications). The insights and alerts may enable controlling and maintaining the devices, leading to efficient and fail-safe operation of the devices. The cloud computing system may also enable modifying parameters associated with the devices and issues control commands via the graphical user interface based on the insights and alerts.

An increasingly popular approach for engineering such complex systems is the concept of design by contract. It prescribes that software designers should define formal, precise and verifiable interface specifications for software components, which extend the ordinary definition of abstract data-types with preconditions, postconditions and invariants. These specifications are referred to as "contracts", in accordance with a conceptual metaphor with the conditions and obligations of business contracts.

Software contracts have initially been proposed by Bertrand Meyer for verification of sequential software programs, using preconditions at the program entry, postconditions at the program exit and invariants for the runtime of the program. [Bertrand Meyer, "Applying 'design by contract", IEEE Computer, Bd. 25. Nr. 10, pp. 40-51, 1992]. The design by contract approach assumes all client components that invoke an operation on a server component will meet the preconditions specified as required for that operation. Where this assumption is considered too risky (as in multi-channel client-server or distributed computing) the opposite "defensive design" approach is taken, meaning that a server component tests (before or while processing a client's request 2018) that all relevant preconditions hold true, and replies with a suitable error message if not.

This approach aims for decreasing certification costs and increasing maintainability of safety-critical systems. Contract-based design enables decomposing requirements onto components and showing their compatibility in the development process. Thereby, contracts support partition of work and isolate properties at interfaces.

Traditionally, a software contract is used primarily as a technique for defensive programming and/or component-based design of software systems as described by T. Gezgin et al. [T. Gezgin, R. Weber und M. Girod, "A refinement checking technique for contract-based architecture design", Fourth International Workshop on Model Based Architecting and Construction of Embedded Systems, ACES-MB, 2011]. Such software contracts contain pre-conditions and post-conditions.

The concept of safety contracts is similar to software contracts with the exception that—instead of defined pre- and post-conditions—a safety contract contains assumptions and guarantees. The main difference between a safety contract and a software contract is that a software contract guarantees functional properties for a component interfaces/ports depending on its environment, but a safety contract guarantees a certain level of integrity of functional properties depending on its environment as described by I. Bate et al. [I. Bate, R. Hawkins und J. McDermid, "A Contract-based Approach to Designing Safe Systems", 8th Australian Workshop on Safety Critical Systems and Software, 2003].

In the article of B. Kaiser et al. [B. Kaiser, R. Weber, M. Oertel, E. Böde, B. M. Nejad und J. Zander, "Contract-based design of embedded systems integrating nominal behavior and safety", Complex Systems Informatics and Modeling Quarterly, Nr. 4, pp. 66-91, 2015] two different types of safety contracts are presented: component contracts and interface contracts. Interface contracts represent assumptions of a specific component as a guarantee for its neighbors (i.e., predecessor and successor in terms of signal/data flow), while component contracts are contracts between a system component and its operational context.

However, it is challenging to generate software contracts which represent a complete set of relevant assumptions in respect of the environment which implies the guarantee behavior—either for a complete system, sub-system or the components of a system.

Currently, safety contracts are created manually by the developers/experts during the design and assessment of the safety-critical system. However, when contracts are created manually, completeness can only be checked by time-consuming reviews performed by experts which is costintensive. Moreover, with the growing of system complexity also the risk to derive deficient contracts is increasing.

In the article of I. Siljivo et al. [I. Sljivo, O. Jaradat, I. Bate und P. Graydon, "Deriving safety contracts to support architecture design of safety critical systems", 2015 IEEE 16th International Symposium on High Assurance Systems Engineering (HASE), pp. 126-133, 2015] a first approach to derive safety contracts from fault tree analysis (FTA) is presented. However, the approach is limited to the use of dedicated safety kernel programs within the system and solely component contracts can be derived using this approach. Furthermore, the fault tree must be designed in a way that components can be clearly identified by an algorithm.

A further approach has been described by B. Kaiser et al. [B. Kaiser, R. Weber, M. Oertel, E. Böde, B. M. Nejad und J. Zander, "Contract-based design of embedded systems integrating nominal behavior and safety", Complex Systems Informatics and Modeling Quarterly, Nr. 4, pp. 66-91, 2015] where safety analysis artefacts in form of component fault tree elements are derived from safety contracts. A component fault tree (CFT) is a Boolean model associated to the components of a system. It has the same expressive power as classic fault trees that can for example be found in the handbook of W. E. Vesely at al. [W. E. Vesely, F. F. Goldberg, N. Roberts und D. F. Haasl, "Fault Tree Handbook," US Nuclear Regulatory Commission, 1981]. As classic fault trees, also CFTs are used to model failure behavior of safety-critical systems. This failure behavior is used to document that a system is safe, and it can also be used to identify drawbacks of the design of a system. However, the safety contracts are also defined manually.

Also, in the approach of I. Sljivo et al. [I. Sljivo, B. Gallina, J. Carlson und H. Hansson, "Generation of safety case argument-fragments from safety contracts", International Conference on Computer Safety, Reliability, and Security, pp. 170-185, 2014] safety contracts are created manually.

SUMMARY

An aspect relatest o techniques that assist in improving the generation of safety contracts.

According to a first aspect, a system for safety analysis of failure behavior comprises a unit comprising two or more components with at least one inport for receiving failure data and one outport for transmitting failure data, wherein for the analysis of the failures data of the components and/or the unit a safety contract is used, and wherein the safety contract is generated automatically by a model-based safety analysis model comprising separate safety analysis model modules which are related to the components of the unit.

In a preferred embodiment, the failure data received at the inport are modelled by using an inport failure mode and the data transmitted from the outport are modelled by using an output failure mode, wherein the inport failure mode and the outport failure mode is defined by the model-based safety analysis model.

In a further embodiment, an internal failure behavior is defined for each component and/or the unit.

A component fault tree model is used for the model-based safety analysis.

In an advantageous embodiment, the safety contract is defined by assumptions and guarantees, wherein an assumption is related to an inport failure and a guarantee is related to an outport failure.

In a preferred embodiment, an interface contract and/or a component contract can be generated as a safety contract for the components and/or the unit.

In a further embodiment, safety requirements and safety-related application conditions are defined for each of the components and/or the unit.

An integrity level is defined for the inport failure modes and the outport failure modes.

According to a second aspect of embodiments of the invention, a method for providing safety analysis of failure behavior for a unit comprising two or more components with at least one inport for receiving failure data and one outport for transmitting failure data comprises the steps of using a model-based safety analysis model which comprises separate SAM modules related to the components of the unit, generating a safety contract from the model-based safety analysis model, using the generated safety contract for the analysis of the failures data of the components and/or the unit.

In a preferred embodiment, the failure data received at the inport are modelled by using an output failure mode and the data transmitted from the outport are modelled by using an output failure mode, wherein the inport failure mode and the outport failure mode is defined by the model-based safety analysis model.

In a further embodiment, an internal failure behavior is defined for each component and/or the unit.

A component fault tree model is used for the model-based safety analysis model.

In a further embodiment, the safety contract is defined by assumptions and guarantees, wherein an assumption is related to an inport data failure and a guarantee is related to an outport data failure.

Advantageously, an interface contract and/or a component contract can be generated as a safety contract for the components and/or the unit.

In a preferred embodiment, safety requirements and safety-related application conditions are defined for each of the components and/or the unit.

An integrity level is defined for the inport failure modes and the outport failure modes.

BRIEF DESCRIPTION

Some of the embodiments will be described in detail, with reference to the following figures, wherein like designations denote like members, wherein.

DETAILED DESCRIPTION

In the following description, for purposes of explanation and not limitation, specific details are set forth in order to provide a thorough understanding of embodiments of the present invention. It will be apparent to one skilled in the art that embodiments of the present invention may be practiced in other implementations that depart from these specific details.

Figure 1:
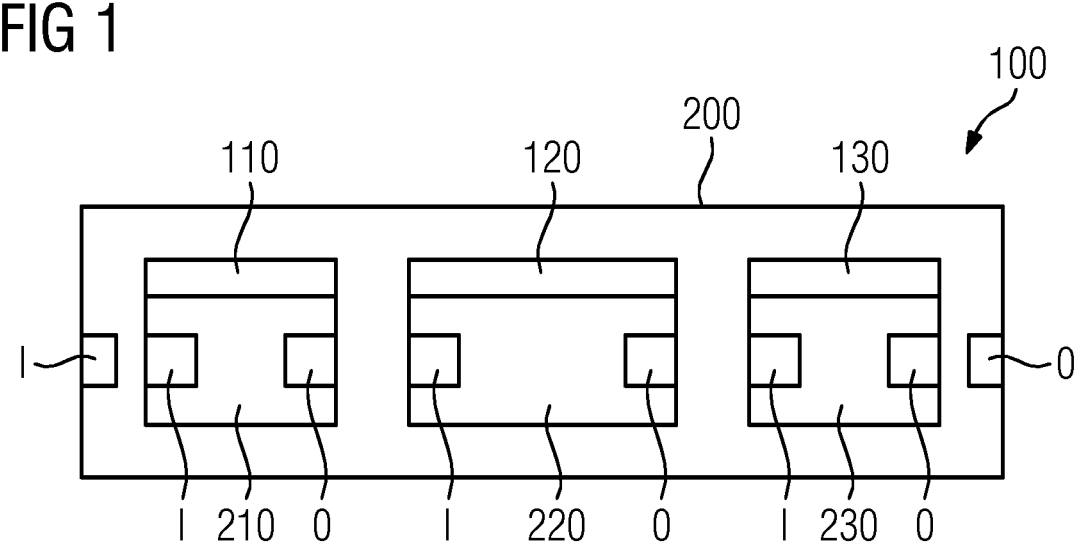
FIG. 1 shows schematically an exemplary system according to an embodiment of the first aspect of the invention.

FIG. 1 provides a general overview of a system 100 for safety analysis of a computing unit 200 comprising several components 210, 220, 230. The computing unit 200 can be a device like an airbag or a complex organization such as an industrial plant. Additional local components, LD, can be added to the unit 200. In the example of an airbag 200 the first component 210 is a crash sensor, the second component 220 is an airbag controller, and the third component 230 is an airbus actuator. For other units 200 the components 210, 220, 230 may be acceleration sensors to capture rotational and vibration data of an actuator, which helps in early detection of various failure modes encountered in rotation mechanical equipment. Other examples are medical devices in a healthcare environment or light and temperature sensors in a smart building or pressure sensors in the automotive area. Each component 210, 220, 230 is defined by an inport, I, for all incoming failure data and an outport, O, for all outcoming failure data.

For the example that an airbag represents the unit 200, a Safety Requirement, SR, can be defined such as:

SR_01: An ignition command is issued at max 5 ms after a crash is detected.

Furthermore, a Safety-Related Application Condition, SRAC, can be defined for the airbag unit 200 and therefore also for the airbag controller 220 such as:

SRAC_01: System operates in a temperature range of −20 to +65 degree Celsius.

For the analysis of failures data of the components 210, 220, 230 of the unit 200 a model-based safety analysis model, SAM, is used. In one preferred embodiment of the system and method of embodiments of the present invention a component fault tree model, CFT, is used as a model-based safety analysis model, SAM. Separate SAM modules 110, 120, 130 are related to the components 210, 220, 230 of the unit 200. This means, the SAM model comprises small, reusable and easy-to-review modules 110, 120, 130.

Figure 2:
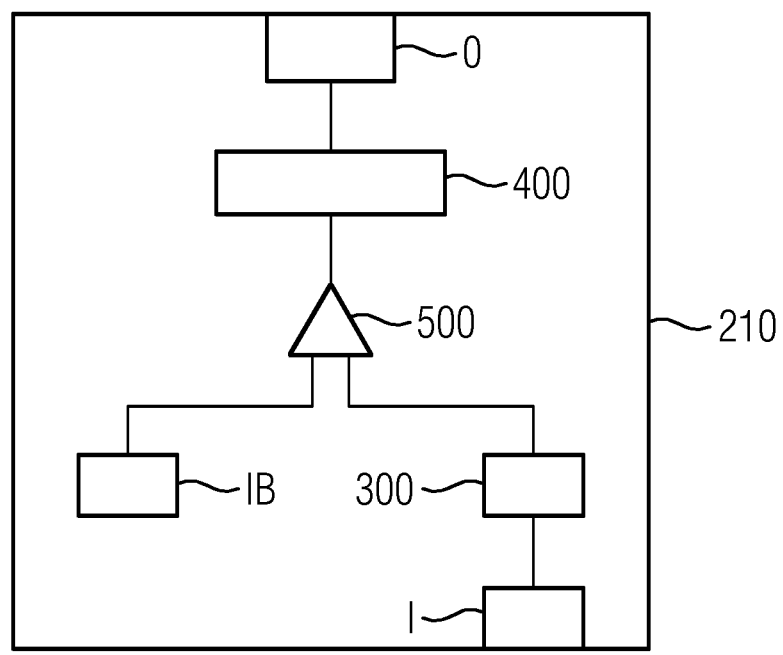
FIG. 2 shows a schematic block diagram illustrating an embodiment of a method according to an embodiment of the second aspect of the present invention.

As illustrated in FIG. 2, failure data received at the outport, O, of a component 210, 220, 230 are modelled by using Output Failure Modes, OFMs, 400 which are related to a specific outport, O. Input failure modes, IMP, 300 are used to model how specific data failures propagate from an inport, I, of a component 210, 220, 230 to an outport, O. The internal failure behavior, IB, also influences the output failure mode 300 of a component 210, 220, 230 and is modelled by using a Boolean gate 500 such as OR and AND as well as basic events.

In a further embodiment, the component fault tree model, CFT, can be extended towards a Directed Acyclic Graph, DAG, model. This avoids an artificial splitting of common cause errors into multiple repeated events as it is possible for more than one path to start from the same basic event or sub-graph.

A safety contract, SC, can be generated according to the method and system of embodiments of the present invention for the components 210, 220, 230 and/or the unit 200. A safety contract, SC, corresponding to the inport and outport failure modes 300, 400 is an interface contract, IC, and is specified in the model-based safety analysis model, SAM, such as the CFT model. The SAM model defines the failure modes 300, 400 and the correlation of the failure modes 300, 400 to specific inports, I, and outports, O, of the components 210, 220, 230. Thereby, each inport failure of a specific inport, I, can be transformed into an assumption for the interface contract, IC, of this inport, I. Each output failure of a specific outport, O, can be transformed into a guarantee of the interface contract, IC, of this outport, O. An assumption negates the inport failure mode 400 and a guarantee negates the outport failure mode 300. Furthermore, for the deduction of the assumptions/guarantees for the interface contracts, IC, the failure modes 300, 400 have to be completed/added with remarks and annotations in order to detail the failure modes 300, 400.

As failure modes 300, 400 are commonly described by a sequence explaining the meaning of the failure modes 300), 400 and maybe with a generic failure type like "too high", a more detailed explanation of the specific character of the failure modes 300, 400 is required to extract contract information. Therefore, according to the method and the system of embodiments of the present invention the explanation of the failure modes 300, 400 in a model-based safety analysis model, SAM, such as a component fault tree, CFT, is extended by a formal description of the meaning of the failure modes 300, 400. In one embodiment of the method and system of embodiments of the present invention this can be executed by describing the failure modes 300, 400 in an object constraint language, OCL, and/or another formal language suitable to express constraints in a machine-readable representation.

Based on the information provided by the model-based safety analysis model, SAM, and the additional information represented in the description and explanation by further remarks and annotations of the failure modes 300, 400, an interface contract, IC, for each of the components 210, 220, 230 or the sub-unit/unit 200 can be generated automatically as described in the following:

The inport/outport failure modes 300, 400 which are mapped to the respective inports/outports, I, O, are transformed into the assumptions/guarantees of the respective interface contract, IC. Thereby, each input/output failure mode 300, 400 is negated to generate the assumption/guarantee of the respective interface contract, IC, or in other words, the constraints specifying the failure modes 300, 400 are negated. For example, the input failure mode 400 in FIG. 2 is transformed into an assumption for the interface contract, IC, of the inport, I, by negating a time delay such as 'I: signal.delay>20 ms'. This results in the assumption 'I: signal delay<20 ms'. By such a negation of the failure modes 300, 400 an interface contract, IC, for each inport/outport, I, O, of the components 210, 220, 230 or the sub-unit/unit 200 is generated.

The model-based safety analysis model, SAM, may allow the safety analysis of the unit 200 by using a quantitative fault tree analysis of the component fault tree for the determination of a failure rate, FR, of each of the failure modes 300, 400. Based on this information the integrity level of the unit 200 and/or the components 210, 220, 230 can be derived. It is also possible to use integrity levels such as (Automotive Safety Integrity Level) ASIL in context of ISO26262, or (Development Assurance Level) DAL in context of ARP4761.

For example, the outport failure mode 400 in FIG. 2 is defined by a failure rate of $8*10^{-6}$ [1/h] which corresponds to a tolerable hazard rate of ASIL B according to ISO 26262. This information regarding the integrity level can be added to the guarantee of the interface contract, IC, comprising this failure mode 300.

Furthermore, component contracts, CC, as a further category of a safety contract, SC, can be derived. A component contract; CC, applies for a component 210, 220, 230 as a whole entity and not to the inports and outports of the component 210, 220, 230. For a component contract, CC, a meta-model such as the Open Dependability Exchange (ODE) metamodel can be used which is described by the DEIS Consortium: [DEIS Consortium, "D3.1: Specification of the Open Dependability Exchange metamodel and documentation of the fundamental concept of Digital Dependability Identities", 2018]. It enables references between a component 210, 220, 230 and its Safety Requirements, SRs, and/or Safety-Related Application Conditions, SRACs.

In the following the generation of component contracts, CCs, for the components 210, 220, 230 of the unit 200 is described.

All outport failure modes 400 of the SAM modules 110, 120, 130 of the components 210, 220, 230 of the unit 200, which are not related to one of the outports, O, of the component 210, 220, 230 are transformed to guarantees of a component contract, CC.

All inport failure modes 300 of the SAM modules 110, 120, 130 of the components 210, 220, 230 of the unit 200, which are not related to one of the inports, I, of the component 210, 220, 230 are transformed to assumptions of a component contract, CC.

All Safety Requirements, SR, which are assigned to one component 210, 220, 230 are guarantees of its component contract, CC.

All Safety-Related Application Conditions, SRACs, specified during the design and development of a safety-relevant unit 200 which have to be fulfilled by the components 210, 220, 230 are assumptions of the component contract, CC.

Safety Requirements, SR, and Safety-Related Application Conditions, SRACS, can be also specified in natural language and/or in a further formal language. Furthermore, a clear mapping of safety requirements, SR, and Safety-Related Application Conditions, SRAC, to the specific components 210, 220, 230 of the unit 200 is necessary. This can be executed by using a meta-model such as the Open Dependability Exchange, ODE, meta-model which enables references between the components 210, 220, 230 of the unit 200 and the requirements specified during the development life-cycle of a unit 200.

Figure 3:
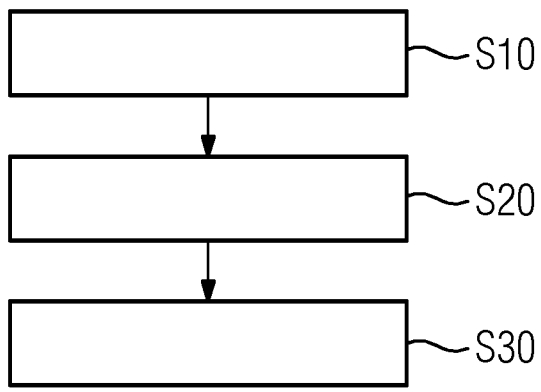
FIG. 3 shows a schematic flow diagram illustrating an embodiment of a method according to an embodiment of the second aspect of the present invention.

FIG. 3 shows a schematic flow diagram illustrating a method according to an embodiment of the second aspect of embodiments of the present invention. The method of FIG. 3 will be described partially using reference signs of FIG. 1, although the method of FIG. 3 is not restricted to the embodiments described in FIG. 1. On the other hand, the method of FIG. 3 may be executed using any of the embodiments described with respect to FIG. 1 and may, accordingly, be adapted and modified according to any variations and modifications described in the foregoing.

In a step S10 of a method for safety analysis for the unit 200 comprising two or more components 210, 220, 230 with at least one inport, I, for receiving failure data and one outport, O, for transmitting failure data a model-based safety analysis model, SAM, which comprises separate SAM modules 110, 120, 130 related to the components 210, 220, 230 of the unit 200 is used.

In a step S20 a safety contract, SC, from the model-based safety analysis model, SAM, is used for the analysis of the failures data of the components 210, 220, 230 and/or the unit 200.

In a step S30 the generated safety contract, SC, for the analysis of the failures data of the components 210, 220, 230 and/or the unit 200 is used.

In further embodiments, instead of component fault tree models, CFT, also any other model-based safety analysis models, SAMs, such as the concept of Hip-Hops can be used as a basis to generate safety contracts, SC. Hip-Hops have been described by Papadopoulos et al. [Papadopoulos, Yiannis, and John A. McDermid, "Hierarchically performed hazard origin and propagation studies", International Conference on Computer Safety, Reliability, and Security. Springer, Berlin, Heidelberg, 1999]. However, also by using another analysis model the failure modes 300, 400 have to be explained by annotations and remarks.

According to embodiments of the present invention, safety contracts, SC, can be generated automatically from model-based safety analysis models, SAM, such as a component fault tree model, CFT, which eases the generation and maintenance effort of such safety contracts, SC. Interface contracts, IC, based on the information available in model-based safety analysis models, SAM, such as in form of component fault tree model, CFT, are generated automatically.

The correctness and completeness of safety contracts, SC, is coupled with the correctness and completeness of the model-based safety analysis model, SAM. This means if the safety analysis model, SAM, is complete, then also the safety contract, SC, is complete.

The use of a safety analysis model, SAM, automates the configuration of safety critical units 200 as it is based on formalizing safety-related application conditions, SRACs. The automatically generated interface contracts, IC, for each of the inports and outports of a component and the component contracts, CC, for the whole component can be checked whether all these contracts are fulfilled for a specific unit configuration 200. Therefore, the method and the system of embodiments of the present invention provides a method and a system to ensure completeness and consistency of safety contracts and a safety assessment in respect to possible artefacts of the components 210, 220, 230 of a unit 200.

In further embodiments, a semi-automated generation of safety contract, SC, based on traditional safety analysis models, SAM, such as Failure Mode and Effect Analysis and fault tree analysis can be implemented. Furthermore, a Domain Specific Language (DSL) can be used to specific safety contracts, SC.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A system for safety analysis of failure behavior comprising:
    a computing unit having two or more components, wherein each component of the two or more components has at least one inport for receiving failure data and one outport for transmitting failure data,
    wherein the system is configured for using a safety contract for analysis of the failure data of the two or more components of the computing unit, and wherein the system is configured for automatically generating the safety contract from a model-based safety analysis model comprising separate modules related to the two or more components of the computing unit, respectively,
    wherein incoming failure data received at the inport are modelled by using an inport failure mode and outcoming failure data transmitted from the outport are modelled by using an outport failure mode, wherein the inport failure mode and the outport failure mode are defined by the model-based safety analysis model,
    wherein an internal failure behavior is defined for each component of the computing unit, and wherein the safety contract for the two or more components of the computing unit is an interface contract, and
    wherein the model-based safety analysis model is a component fault tree model,
    wherein each inport failure mode and outport failure mode is described in an object constraint language, wherein each inport failure mode related to a respective inport is transformed into an assumption for the interface contract and each outport failure mode related to a respective outport is transformed into a guarantee of the interface contract, wherein transformation of each inport failure mode of the interface contract and outport failure mode of the interface contract includes negation of constraints specifying the respective inport failure mode and respective outport failure mode to automatically generate the interface contract.

2. The system as claimed in claim 1, wherein outport failure modes of the two or more components that are not related to the outport are transformed to guarantees of a component contract and inport failure modes of the two or more components that are not related to the inport are transformed to assumptions of the component contract.

3. The system as claimed in claim 1, wherein safety requirements and safety-related application conditions, SRAC, are defined for each of the components of the computing unit.

4. The system as claimed in claim 1, wherein an integrity level is defined for the inport failure modes and the outport failure modes.

5. A method for providing safety analysis of failure behavior for a computing unit comprising two or more components, wherein each component of the two or more components has at least one inport for receiving failure data and one outport for transmitting failure data, and wherein separate safety analysis model modules are related to the respective components, comprising:
   (a) utilizing, by the computing unit, a model-based safety analysis model for the separate safety analysis modules;
   (b) generating, by the computing unit, a safety contract from the model-based safety analysis model by the separate safety analysis modules; and
   (c) utilizing, by the computing unit, the generated safety contract for the analysis of the failures data of the components, wherein failure data received at the inport are modelled by using an inport failure mode and failure data transmitted from the outport are modelled by using an outport failure mode, wherein the inport failure mode and the outport failure mode are defined by the model-based safety analysis model, wherein an internal failure behavior is defined for each component of the computing unit, and wherein the safety contract for the two or more components of the computing unit is an interface contract, and wherein the model-based safety analysis model is a component fault tree model, wherein each inport failure mode and outport failure mode is described in an object constraint language, wherein each inport failure mode related to a respective inport is transformed into an assumption for the interface contract and each outport failure mode related to a respective outport is transformed into a guarantee of the interface contract, wherein transformation of each inport failure mode of the interface contract and outport failure mode of the interface contract includes negation of constraints specifying the respective inport failure mode and respective outport failure mode to automatically generate the interface contract.

6. The method as claimed in claim 5, wherein outport failure modes of the two or more components that are not related to the outport are transformed to guarantees of a component contract and inport failure modes of the two or more components that are not related to the inport are transformed to assumptions of the component contract.

7. The method as claimed in claim 5, wherein safety requirements and safety-related application conditions, SRAC, are defined for each of the components of the computing unit.

8. The method as claimed in claim 5, wherein an integrity level is defined for the inport failure modes and the outport failure modes.

* * * * *